US009711987B2

United States Patent
Choi et al.

(10) Patent No.: US 9,711,987 B2
(45) Date of Patent: Jul. 18, 2017

(54) APPARATUS AND METHOD FOR MANAGING ENERGY IN BUILDING BASED ON STATE OF HEALTH OF ENERGY STORAGE SYSTEM

(71) Applicant: Electronics and Telecommunications Research Institute, Daejeon (KR)

(72) Inventors: Jongwoo Choi, Seoul (KR); Il Woo Lee, Daejeon (KR); Youn Kwae Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 82 days.

(21) Appl. No.: 14/842,918

(22) Filed: Sep. 2, 2015

(65) Prior Publication Data

US 2016/0352125 A1    Dec. 1, 2016

(30) Foreign Application Priority Data

Jun. 1, 2015 (KR) .......................... 10-2015-0077151

(51) Int. Cl.
*H02J 7/00* (2006.01)
*G06Q 50/06* (2012.01)
*H02J 3/32* (2006.01)

(52) U.S. Cl.
CPC ............ *H02J 7/0063* (2013.01); *G06Q 50/06* (2013.01); *H02J 3/32* (2013.01); *H02J 2007/0067* (2013.01)

(58) Field of Classification Search
CPC ........ H02J 7/007; H02J 7/0063; H02J 7/0068; B60L 11/1611; B60L 11/1861; G01R 31/3673; G01R 31/3675; G01R 31/3679

USPC ......................................... 320/132, 134, 136
See application file for complete search history.

(56) References Cited

U.S. PATENT DOCUMENTS

| | | | |
|---|---|---|---|
| 2003/0052647 A1 | 3/2003 | Yoshida et al. | |
| 2011/0062912 A1 | 3/2011 | Yang et al. | |
| 2012/0249152 A1* | 10/2012 | Nishibayashi | ........ H02J 7/0063 324/430 |

(Continued)

FOREIGN PATENT DOCUMENTS

| | | |
|---|---|---|
| KR | 1020120078057 A | 7/2012 |
| KR | 1020120134415 A | 12/2012 |

(Continued)

OTHER PUBLICATIONS

Scott J. Moura et al., Battery-Health Conscious Power Management in Plug-In Hybrid Electric Vehicles via Electrochemical Modeling and Stochastic Control, IEEE Transactions on Control Systems Technology, 2013 pp. 1-16.

*Primary Examiner* — Paul Dinh
(74) *Attorney, Agent, or Firm* — William Park & Associates Ltd.

(57) ABSTRACT

An apparatus and method for managing energy are disclosed herein. The apparatus for managing energy includes a State-of-Health (SOH) determination unit and an energy distribution unit. The SOH determination unit collects information about energy storage systems and energy facilities, and determines the SOH of each of the energy storage systems based on the information. The energy distribution unit distributes energy stored in the energy storage system to loads inside a building based on the information and the SOH.

16 Claims, 8 Drawing Sheets

(56) References Cited

U.S. PATENT DOCUMENTS

| 2013/0082640 | A1* | 4/2013 | Nishibayashi | H02J 3/32 |
| | | | | 320/106 |
| 2013/0162037 | A1 | 6/2013 | Kim et al. | |
| 2013/0218356 | A1 | 8/2013 | Lee et al. | |
| 2013/0346001 | A1 | 12/2013 | Park et al. | |

FOREIGN PATENT DOCUMENTS

| KR | 1020130074046 A | 7/2013 |
| KR | 1020130089360 A | 8/2013 |
| WO | 2012165842 A2 | 12/2012 |

\* cited by examiner

APPARATUS AND METHOD FOR MANAGING ENERGY IN BUILDING BASED ON STATE OF HEALTH OF ENERGY STORAGE SYSTEM

CROSS-REFERENCE TO RELATED APPLICATION

This application claims the benefit of Korean Patent Application No. 10-2015-0077151, filed Jun. 1, 2015, which is hereby incorporated by reference herein in its entirety.

BACKGROUND

1. Technical Field

The present disclosure relates generally to a scheme for managing an energy storage system present inside a building and, more particularly, to technology that assigns loads based on the operation information of energy storage systems, collected to effectively operate a system for managing energy that is consumed in a building, and collected information so that costs can be minimized.

2. Description of the Related Art

In line with growing concerns regarding energy demand and supply issues and environmental influence, the management of energy facilities in a building is being increasingly performed. In a building, there are various types of energy facilities for utilizing energy, such as a boiler, a heat pump, an air blower, etc., and energy storage systems (ESSs) for generating or storing energy, such as a battery, a fuel cell battery, a solar battery, etc. The effective usage of energy storage systems can aid in demand management (DM) and demand response (DR) regarding power, for example, by means of a reduction in power consumption in a peak time span or the like, and can also aid a building administrator in reducing energy usage costs in active response to a season/time-differentiated pricing system.

To achieve balance between energy facilities and energy storage systems, a building energy management system (BEMS) performs the control of the energy facilities and the energy storage systems. The building energy management system aims to achieve a reduction in terms of the overall energy consumption costs of a building by analyzing the patterns of energy usage of energy facilities and enabling energy storage systems to efficiently operate in conjunction with each other.

An energy storage system is managed using a method of monitoring the internal factors of each cell of the energy storage system, such as current, voltage, internal resistance, etc. A battery management system (BMS), i.e., one of the commonly used energy storage system managing systems, monitors the above-mentioned internal factors at a system chip level, diagnoses the state of each cell based on the results of the monitoring, and performs management. Energy storage systems, such as fuel cell batteries, solar batteries, etc., other than batteries, can be managed using the same method.

In a conventional technology, energy storage systems are managed using only the above-described basic performance factors of each cell of the energy storage systems. In this method, energy storage systems are managed based on the real time electricity price, the amount of energy stored in a current energy storage system, and the level of loads generated in energy facilities. However, maintenance and repair aspects, represented by commissioning and measurement & verification (M&V), in the energy management of a building must be taken into account in the management of energy storage systems in the same manner. An energy storage system present in a building is used for a long period, such as for tens of years, due to the fact that the building is used for a long period. During this period, the inner cells of the energy storage system are degraded.

Korean Patent Application Publication No. 2012-0134415 discloses a technology that measures and determines the State of Health (SOH) of a battery based on the voltage, temperature and State of Charge (SOC) of a battery cell, which is a basic Energy Storage System (ESS).

However, Korean Patent Application Publication No. 2012-0134415 merely discloses a technology for measuring the SOH of a battery, but does not suggest or imply a technology for adjusting the loads of energy facilities based on the SOH of a battery inside an energy storage system.

Therefore, in light of a current tendency to put emphasis on an energy demand and supply issue and environmental influence, there is a growing need for technology for adjusting the loads of energy facilities inside a building based on the SOH of a battery.

SUMMARY

At least one embodiment of the present invention is intended to assign loads by taking into account the SOH of an energy storage system, thereby minimizing the maintenance cost of the energy storage system inside a building.

At least one embodiment of the present invention is intended to predict costs by taking into account the maintenance cost of an energy storage system and the cost of power consumption and use a load assignment method corresponding to a minimum cost, thereby minimizing the maintenance cost of a building.

At least one embodiment of the present invention is intended to predict power consumption using the external temperature of a building and assign loads using the predicted power consumption.

In accordance with an aspect of the present invention, there is provided an apparatus for managing energy, including: a State-of-Health (SOH) determination unit configured to collect information about energy storage systems and energy facilities, and to determine the State of Health (SOH) of each of the energy storage systems based on the information; and an energy distribution unit configured to distribute energy stored in the energy storage system to loads inside a building based on the information and the SOH.

The SOH determination unit may include: a State-of-Charge (SOC) determination unit configured to determine a State of Charge (SOC) based on the input load, output load and voltage of each cell of the energy storage system; and a determination unit configured to determine the SOH based on the SOC, the voltage of the cell, and the temperature of the cell.

The SOC determination unit may determine the SOC using the following equation:

$$SOC = SOC_{init} + (I*dt)/Q_{max}$$

where $SOC_{init}$ is the SOC in an existing state, dt is the time that has elapsed after the SOC in an existing state was calculated, I is the current flowing through the cell, and $Q_{max}$ is the maximum energy storage capacity of the cell.

The determination unit may determine the SOH of the energy storage system using the following equation:

$$SOH = -a1*R + a2*\ln((SOC-SOC_{min})/(SOC_{max}-SOC_{min})) + a3*\ln((V-V_{min})/(V_{max}-V_{min})) + a4*\ln((T-T_{min})/(T_{max}-T_{min}))$$

where R is the internal resistance, SOC is the state of charge, V is the voltage of the cell, T is the temperature, $V_{max}$ is the maximum value of the voltage, $V_{min}$ is the minimum value of the voltage, $SOC_{max}$ is the maximum value of the SOC, $SOC_{min}$ is the minimum value of the SOC, $T_{max}$ is the maximum temperature of the cell, $T_{min}$ is the minimum temperature of the cell, and a1, a2, a3 and a4 are constants.

The energy distribution unit may include: a collection unit configured to collects the external information of the building; and a prediction unit configured to predict a method of distributing energy to the loads based on the external information of the building and the SOH of the energy storage system.

The collection unit may collect information of the real time electricity price.

The prediction unit may include: a cost calculation unit configured to calculate a cost based on the real time electricity price, the SOC of the energy storage system, the SOH of the energy storage system, and a predicted load value; and a determination unit configured to determine a load assignment method, corresponding to the predicted load value, based on the cost.

The determination unit may determine the load assignment method so that the load assignment method corresponds to the cost having a minimum value.

The cost calculation unit may calculate the cost using the following equation:

$$COST = I*V*PR - a5*SOH$$

where PR is the real time electricity price, V is the voltage of the energy storage system, I is current flowing through the energy storage system, SOH is the SOH of the energy storage system, and a5 is a constant corresponding to the SOH and the cost.

The cost calculation unit may predict the load value using the following equation:

$$P_{predict} = P_{old} \times T_{amb,new} / T_{amb,old}$$

where $P_{predict}$ is the predicted load value, $P_{old}$ is a real load value of a similar past period, $T_{amb,new}$ is current external temperature, and $T_{amb,old}$ is past external temperature.

In accordance with another aspect of the present invention, there is provided a method of managing energy, including: collecting information about one or more energy storage systems and energy facilities, and determining the State of Health (SOH) of each of the energy storage systems based on the information; and distributing energy stored in the energy storage system to loads inside a building based on the information and the SOH.

Determining the SOH may include: determining a State of Charge (SOC) based on the input load, output load and voltage of each cell of the energy storage system; and determining the SOH based on the SOC, the voltage of the cell, and the temperature of the cell.

Determining the SOC may include determining the SOC using the following equation:

$$SOC = SOC_{init} + (I*dt)/Q_{max}$$

where $SOC_{init}$ is the SOC in an existing state, dt is the time that has elapsed after the SOC in an existing state was calculated, I is the current flowing through the cell, and $Q_{max}$ is the maximum energy storage capacity of the cell.

Determining the SOH may include determining the SOH using the following equation:

$$SOH = -a1*R + a2*\ln((SOC-SOC_{min})/(SOC_{max}-SOC_{min})) + a3*\ln((V-V_{min})/(V_{max}-V_{min})) + a4*\ln((T-T_{min})/(T_{max}-T_{min}))$$

where R is the internal resistance, SOC is the state of charge, V is the voltage of the cell, T is the temperature, $V_{max}$ is the maximum value of the voltage, $V_{min}$ is the minimum value of the voltage, $SOC_{max}$ is the maximum value of the SOC, $SOC_{min}$ is the minimum value of the SOC, $T_{max}$ is the maximum temperature of the cell, $T_{min}$ is the minimum temperature of the cell, and a1, a2 a3 and a4 are constants.

Distributing the energy may include: collecting the external information of the building; and predicting a method of distributing energy to the loads based on the external information of the building and the SOH of the energy storage system.

Collecting the external information may include collecting information of the real time electricity price.

Predicting the method of distributing energy may include: calculating a cost based on the real time electricity price, the SOC of the energy storage system, the SOH of the energy storage system, and a predicted load value; and determining a load assignment method, corresponding to the predicted load value, based on the cost.

Determining the load assignment method may include determining the load assignment method so that the load assignment method corresponds to the cost having a minimum value.

Calculating the cost may include calculating the cost using the following equation:

$$COST = I*V*PR - a5*SOH$$

where PR is the real time electricity price, V is the voltage of the energy storage system, I is current flowing through the energy storage system, SOH is the SOH of the energy storage system, and a5 is a constant corresponding to the SOH and the cost.

Calculating the cost may include predicting the load value using the following equation:

$$P_{predict} = P_{old} \times T_{amb,new} / T_{amb,old}$$

where $P_{predict}$ is the predicted load value, $P_{old}$ is a real load value of a similar past period, i $T_{amb,new}$ is current external temperature, and $T_{amb,old}$ is past external temperature.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The present invention will be described in detail below with reference to the accompanying drawings. Redundant descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes and the like of components in the drawings may be exaggerated to make the description obvious.

Embodiments of the present invention are described in detail below with reference to the accompanying drawings.

Figure 1:
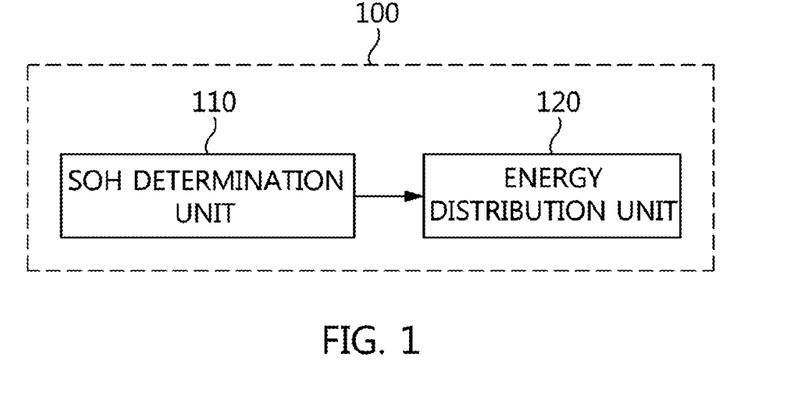
FIG. 1 is a block diagram showing an apparatus for managing energy in a building based on the SOH of an energy storage system according to an embodiment of the present invention.

FIG. 1 is a block diagram showing an apparatus 100 for managing energy in a building based on the SOH of an energy storage system according to an embodiment of the present invention.

Referring to FIG. 1, the apparatus 100 for managing energy on the SOH of an energy storage system according to the present embodiment includes an SOH determination unit 110, and an energy distribution unit 120.

The SOH determination unit 110 collects information about energy storage systems and energy facilities, and determines the SOH of each of the energy storage systems based on the collected information.

In this case, the energy storage systems (ESSs) may include all types of equipment that are capable of storing energy. For example, a battery, a solar battery, a fuel cell battery, etc. may correspond to the energy storage systems.

In this case, the energy facilities may include all types of equipment that consume energy. For example, an air conditioner, a hot-air blower, a chilled-air blower, a ventilator, a drainage system, etc. may correspond to the energy facilities.

In this case, the information about energy storage systems may include information about the states of charge of a battery, a solar cell, a fuel cell battery, etc. present inside a building, voltage and current input to a current energy storage system, voltage and current output by the current energy storage system, etc.

In this case, the information about energy facilities may include information about the operating states and operation-consumed energy loads of cooling and heating equipment, ventilation equipment, air conditioning equipment, lighting equipment, plumbing equipment, transfer equipment, etc.

In this case, the SOH of each of the energy storage systems is represented by a performance index indicative of the comparison between the ideal and current states of the energy storage system.

In this case, the SOH of the energy storage system is determined based on the SOC of the energy storage system based on the input load, output load and voltage of cells that constitute the energy storage system. This will be described with reference to FIG. 2 later.

In this case, the SOC of the energy storage system may refer to the basic operating state of the energy storage system. This will be described with reference to FIG. 2 later.

The energy distribution unit 120 distributes energy stored in the energy storage system to loads inside a building based on the information and the SOH.

In this case, the energy distribution unit 120 may collect the external information of the building, and then may distribute energy to the loads based on the SOH of the energy storage system and the external information of the building.

In this case, the external information of the building may include the electricity price, corresponding to power used inside the building, and the external temperature of the building.

In this case, the energy distribution unit 120 may determine a method of distributing the energy stored in the energy storage system to the loads inside the building based on the costs that are incurred when the loads use the energy.

In this case, energy distribution unit 120 may determine the method of distributing the energy stored in the energy storage system to the loads inside the building so that the costs that are incurred when the loads use the energy can be minimized.

In this case, when calculating the energy usage costs, the energy distribution unit 120 may calculate the energy usage costs using the predictive values of one or more loads, and may distribute energy to the loads inside the building using the predictive value of a load having the lowest energy usage cost.

In this case, the energy distribution unit 120 may predict loads using the external temperature of the building. The reason for this is that the loads of energy facilities inside a building are most greatly influenced by a weather environment.

Figure 2:
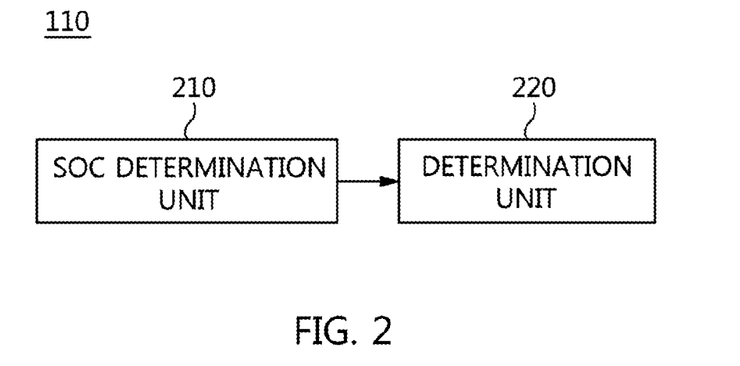
FIG. 2 is a block diagram showing an embodiment of the SOH determination unit shown in FIG. 1.

FIG. 2 is a block diagram showing an embodiment of the SOH determination unit 110 shown in FIG. 1.

Referring to FIG. 2, the SOH determination unit 110 includes an SOC determination unit 210 and a determination unit 220.

The SOC determination unit 210 determines an SOC based on the input load, output load and voltage of each cell inside the energy storage system.

In this case, the SOC refers to the amount of energy stored in the energy storage system.

In this case, to determine the SOC, it is necessary to measure the current load of each cell inside the energy storage system. The current load may be measured using Equation 1:

$$I = (P_{in} - P_{out})/V \qquad (1)$$

where I is the current load of the cell inside the energy storage system, V is the voltage of the cell, $P_{in}$ is the input power, and $P_{out}$ is the output power.

In this case, the SOC may be calculated using Equation 2:

$$SOC = SOC_{init} + (I*dt)/Q_{max} \qquad (2)$$

where $SOC_{init}$ is the SOC in an existing state, dt is the time that has elapsed after the SOC in an existing state was calculated, I is the current flowing through the cell, and $Q_{max}$ is the maximum energy storage capacity of the cell.

The determination unit 220 determines the SOH of the energy storage system based on the SOC, the voltage of the cell, and the temperature of the cell.

In this case, the SOC of the energy storage system is the same as the SOC that is determined by the SOC determination unit 210.

In this case, a method of measuring the voltage of the cell and a method of measuring the temperature of the cell are not limited to particular methods.

In this case, the SOH of the energy storage system may be represented by a performance index indicative of the comparison between the ideal and current states of the energy storage system.

In this case, the SOH of the energy storage system is determined based on the SOC of the energy storage system based on the input load, output load and voltage of cells that constitute the energy storage system.

In this case, the SOH of the energy storage system may be defined using Equation 3:

$$SOH = -a1*R + a2*\ln((SOC - SOC_{min})/(SOC_{max} - SOC_{min})) + a3*\ln((V - V_{min})/(V_{max} - V_{min})) + a4*\ln((T - T_{min})/(T_{max} - T_{min})) \quad (3)$$

where R is the internal resistance, SOC is the state of charge, V is the voltage of the cell, T is the temperature, $V_{max}$ is the maximum value of the voltage, $V_{min}$ is the minimum value of the voltage, $SOC_{max}$ is the maximum value of the SOC, $SOC_{min}$ is the minimum value of the SOC, $T_{max}$ is the maximum temperature of the cell, $T_{min}$ is the minimum temperature of the cell, and a1, a2, a3 and a4 are constants.

In this case, a1, a2, a3 and a4 described in Equation 3 are constants indicative of influences that respective state factors of the energy storage system have on the SOH of the energy storage system.

In this case, a1, a2, a3 and a4 described in Equation 3 may be constants that is tunable in response to a request from an administrator.

In this case, when an existing SOH has been measured, a current SOH may be calculated using Equation 4:

$$SOH = SOH_{init} + (d\_SOH*dt) \quad (4)$$

where $SOH_{init}$ is an SOH in an existing state, dt is the time that has elapsed after the SOH in the existing state was calculated, and d_SOH is the rate of change of the SOH.

Figure 3:
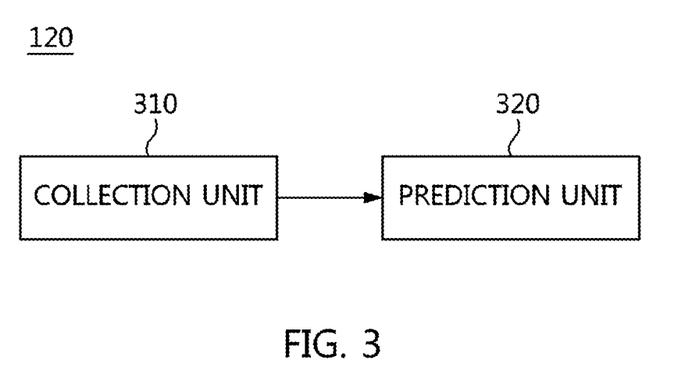
FIG. 3 is a block diagram showing an embodiment of the energy distribution unit shown in FIG. 1.

FIG. 3 is a block diagram showing an embodiment of the energy distribution unit 120 shown in FIG. 1.

Referring to FIG. 3, the energy distribution unit 120 includes a collection unit 310 and a prediction unit 320.

The collection unit 310 collects the external information of a building.

In this case, the external information of the building may include information of the real time electricity price and information of the external temperature of the building.

In this case, the information of the real time electricity price may be used to calculate the electricity price attributable to the energy that is consumed by a load.

In this case, the information of the external temperature of the building may be used to predict the energy that is consumed by the load.

The prediction unit 320 predicts a method of distributing energy to loads based on the external information of the building and the SOH of the energy storage system.

In this case, the prediction unit 320 calculates costs, corresponding to energy to be consumed, based on a predicted load value consumed by energy facilities, the real time electricity price and the SOH of the energy storage system, and predicts a load assignment method based on the calculated costs.

In this case, the load assignment method may be predicted based on a predicted load value corresponding to the minimum value of the costs calculated by the prediction unit 320. This is described with reference to FIG. 4.

Figure 4:
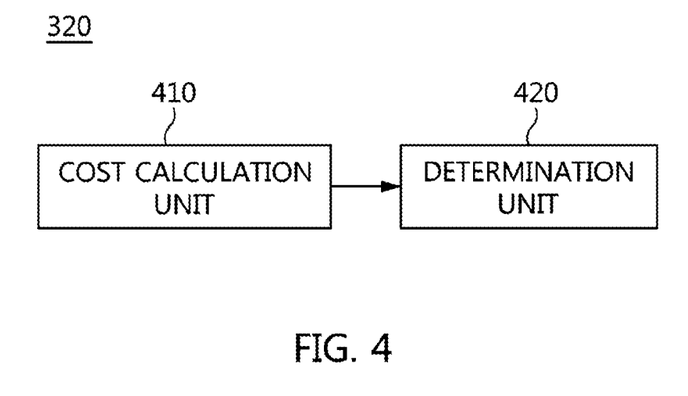
FIG. 4 is a block diagram showing an embodiment of the prediction unit shown in FIG. 3.

FIG. 4 is a block diagram showing an embodiment of the prediction unit 320 shown in FIG. 3.

Referring to FIG. 4, the prediction unit 320 includes a cost calculation unit 410 and a determination unit 420.

The cost calculation unit 410 calculates costs based on the real time electricity price, the SOC of each energy storage system, the SOH of the energy storage system, and the predicted load value.

In this case, the cost may be calculated using Equation 5:

$$COST = I*V*PR - a5*SOH \quad (5)$$

where PR is the real time electricity price, V is the voltage of the energy storage system, I is current flowing through the energy storage system, SOH is the SOH of the energy storage system, and a5 is a constant corresponding to the SOH and the cost.

In this case, a5 refers to a constant corresponding to the SOH and the cost, and is a constant in which an influence that the SOH of the energy storage system has in terms of cost has been taken into account. For example, when the SOH of the energy storage system is poor, future facility investment costs may increase, which has been taken into account in the above constant. In contrast, for example, when the SOH of the energy storage system is good, future facility investment costs may decrease, which has been taken into account in the above constant.

In this case, the voltage and current of the energy storage system may be calculated through load prediction, and the load prediction may be predicted using Equation 6:

$$P_{predict} = P_{old} \times T_{amb,new}/T_{amb,old} \quad (6)$$

where $P_{predict}$ is the predicted load value, $P_{old}$ is a real load value of a similar past period, $T_{amb,new}$ is current external temperature, and $T_{amb,old}$ is past external temperature.

In this case, Equation 6 determines the length of a period over which a load will be predicted in load prediction, then predicts the size of the load that will be used by energy facilities within the period.

In this case, it can be seen that Equation 6 predicts the load using external weather data. The reason for this is to take into account the fact that the load of the energy facilities inside a building is most greatly influenced by a weather environment.

The determination unit 420 determines a load assignment method, corresponding to the predicted load value, based on the costs calculated by the cost calculation unit 410.

In this case, the determination unit 420 may predict the load assignment method based on information corresponding to the minimum value of the costs calculated by the cost calculation unit 410.

In this case, the information corresponding to the minimum value of the costs may include the voltage and current of the energy storage system, and energy may be distributed to loads based on the predicted voltage and current of the energy storage system.

Figure 5:
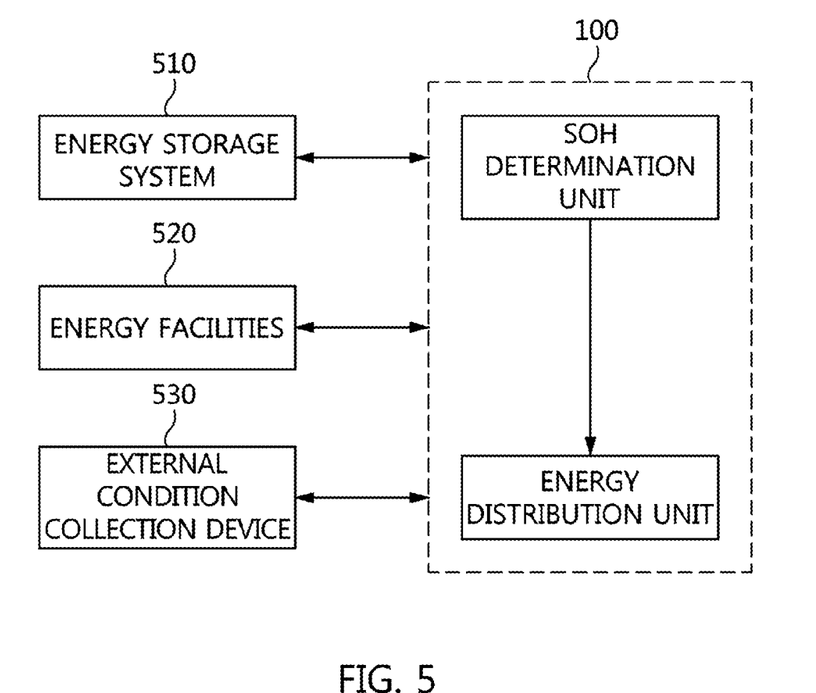
FIG. 5 is a block diagram showing an apparatus for managing energy based on the SOH of an energy storage system according to an embodiment of the present invention.

FIG. 5 is a block diagram showing an apparatus 100 for managing energy based on the SOH of an energy storage system according to an embodiment of the present invention.

Referring to FIG. 5, the apparatus 100 for managing energy, an energy storage system 510, an energy facilities 520, and an external condition collection device 530 are shown in the drawing.

In this case, the apparatus 100 for managing energy may collect information from the energy storage system 510. The information collected from the energy storage system 510 may include information about the states of charge of a battery, a solar cell, a fuel cell battery, etc. present inside a building, voltage and current input to the current energy storage system, voltage and current output by the current energy storage system, etc.

In this case, the energy storage system 510 may include all types of equipment that are capable of storing energy. For example, a battery, a solar battery, a fuel cell battery, etc. may correspond to the energy storage systems.

In this case, the apparatus 100 for managing energy may collect information from the energy facilities 520. The information collected from the energy facilities 520 may include information about the operating states and operation-consumed energy loads of cooling and heating equipment, ventilation equipment, air conditioning equipment, lighting equipment, plumbing equipment, transfer equipment, etc.

In this case, the energy facilities 520 may include all types of equipment that consume energy. For example, an air conditioner, a hot-air blower, a chilled-air blower, a ventilator, a drainage system, etc. may correspond to the energy facilities.

In this case, the apparatus 100 for managing energy may collect information about an external condition from the external condition collection device 530.

In this case, the external condition may be the external information of a building.

In this case, the external information of a building may include information of the real time electricity price and information of the external temperature of the building.

In this case, apparatus 100 for managing energy may calculate the SOH of the energy storage system based on the collected information. A description of this has been given with reference to FIG. 2.

In this case, the apparatus 100 for managing energy may predict how to distribute energy stored in the energy storage system to loads inside the building based on the calculated SOH of the energy storage system and the external information of the energy storage system, the energy facilities and the building.

In this case, the apparatus 100 for managing energy distributes the energy stored in the energy storage system to loads inside the building in such a way as to calculate a cost based on the real time electricity price, the SOH of the energy storage system and current and voltage applied to the energy storage system, calculate costs while varying the current and the voltage, and then distribute the energy stored in the energy storage system to the loads inside the building based on current and voltage corresponding to the minimum cost of the calculated costs.

Figure 6:
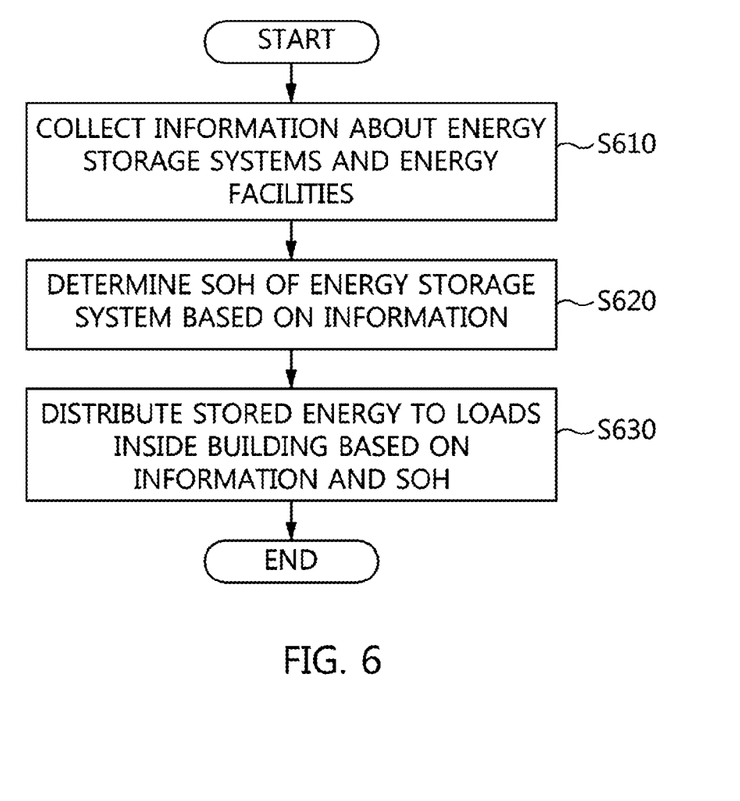
FIG. 6 is an operation flowchart showing a method of managing energy based on the SOH of an energy storage system according to an embodiment of the present invention.

FIG. 6 is an operation flowchart showing a method of managing energy based on the SOH of an energy storage system according to an embodiment of the present invention.

Referring to FIG. 6, information regarding energy storage systems and energy facilities is collected at step S610.

In this case, the energy storage systems (ESSs) may include all types of equipment that are capable of storing energy. For example, a battery, a solar battery, a fuel cell battery, etc. may correspond to the energy storage systems.

In this case, the energy facilities may include all types of equipment that consume energy. For example, an air conditioner, a hot-air blower, a chilled-air blower, a ventilator, a drainage system, etc. may correspond to the energy facilities.

In this case, the information about energy storage systems may include information about the states of charge of a battery, a solar cell, a fuel cell battery, etc. present inside a building, voltage and current input to a current energy storage system, voltage and current output by the current energy storage system, etc.

In this case, the information about energy facilities may include information about the operating states and operation-consumed energy loads of cooling and heating equipment, ventilation equipment, air conditioning equipment, lighting equipment, plumbing equipment, transfer equipment, etc.

Furthermore, the SOH of each of the energy storage systems is determined based on the collected information at step S620.

In this case, the SOH of each of the energy storage systems is represented by a performance index indicative of the comparison between the ideal and current states of the energy storage system.

In this case, the SOH of the energy storage system is determined based on the SOC of the energy storage system based on the input load, output load and voltage of cells that constitute the energy storage system. This will be described with reference to FIG. 2 later.

In this case, the SOC of the energy storage system may refer to the basic operating state of the energy storage system.

In this case, the SOC and SOH of each energy storage system may be calculated using Equations 2 and 3, respectively:

$$SOC = SOC_{init} + (I*dt)/Q_{max} \tag{2}$$

where $SOC_{init}$ is the SOC in an existing state, dt is the time that has elapsed after the SOC in an existing state was calculated, I is the current flowing through the cell, and $Q_{max}$ is the maximum energy storage capacity of the cell.

$$SOH = -a1*R + a2*\ln((SOC-SOC_{min})/(SOC_{max}-SOC_{min})) + a3*\ln((V-V_{min})/(V_{max}-V_{min})) + a4*\ln((T-T_{min})/(T_{max}-T_{min})) \tag{3}$$

where R is the internal resistance, SOC is the state of charge, V is the voltage of the cell, T is the temperature, $V_{max}$ is the maximum value of the voltage, $V_{min}$ is the minimum value of the voltage, SOC, $T_{max}$ is the maximum value of the SOC, $SOC_{min}$ is the minimum value of the SOC, $T_{max}$ is the maximum temperature of the cell, $T_{min}$ is the minimum temperature of the cell, and a1, a2, a3 and a4 are constants.

Furthermore, energy stored in the energy storage system is distributed to loads inside a building based on the information and the SOH at step S630.

In this case, the external information of the building may be collected, and then energy may be distributed to the loads based on the SOH of the energy storage system and the external information of the building.

In this case, the external information of the building may include the electricity price corresponding to power used inside the building, and the external temperature of the building.

In this case, a method of distributing the energy stored in the energy storage system to the loads inside the building may be determined based on the costs that are incurred when the loads use the energy.

In this case, the method of distributing the energy stored in the energy storage system to the loads inside the building may be determined such that the costs that are incurred when the loads use the energy can be minimized.

In this case, when the energy usage costs are calculated, energy usage costs may be calculated using the predictive values of one or more loads, and energy may be distributed to the loads inside the building using the predictive value of a load having the lowest energy usage cost.

In this case, the cost may be calculated using Equation 5:

$$COST = I*V*PR - a5*SOH \tag{5}$$

where PR is the real time electricity price, V is the voltage of the energy storage system, I is current flowing through the energy storage system, SOH is the SOH of the energy storage system, and a5 is a constant corresponding to the SOH and the cost.

In this case, loads may be predicted using the external temperature of the building. The reason for this is that the loads of energy facilities inside a building are most greatly influenced by a weather environment. The loads may be predicted using Equation 6:

$$P_{predict} = P_{old} \times T_{amb,new}/T_{amb,old} \quad (6)$$

where $P_{predict}$ is the predicted load value, $P_{old}$ is a real load value of a similar past period, i $T_{amb,new}$ is current external temperature, and $T_{amb,old}$ is past external temperature.

Figure 7:
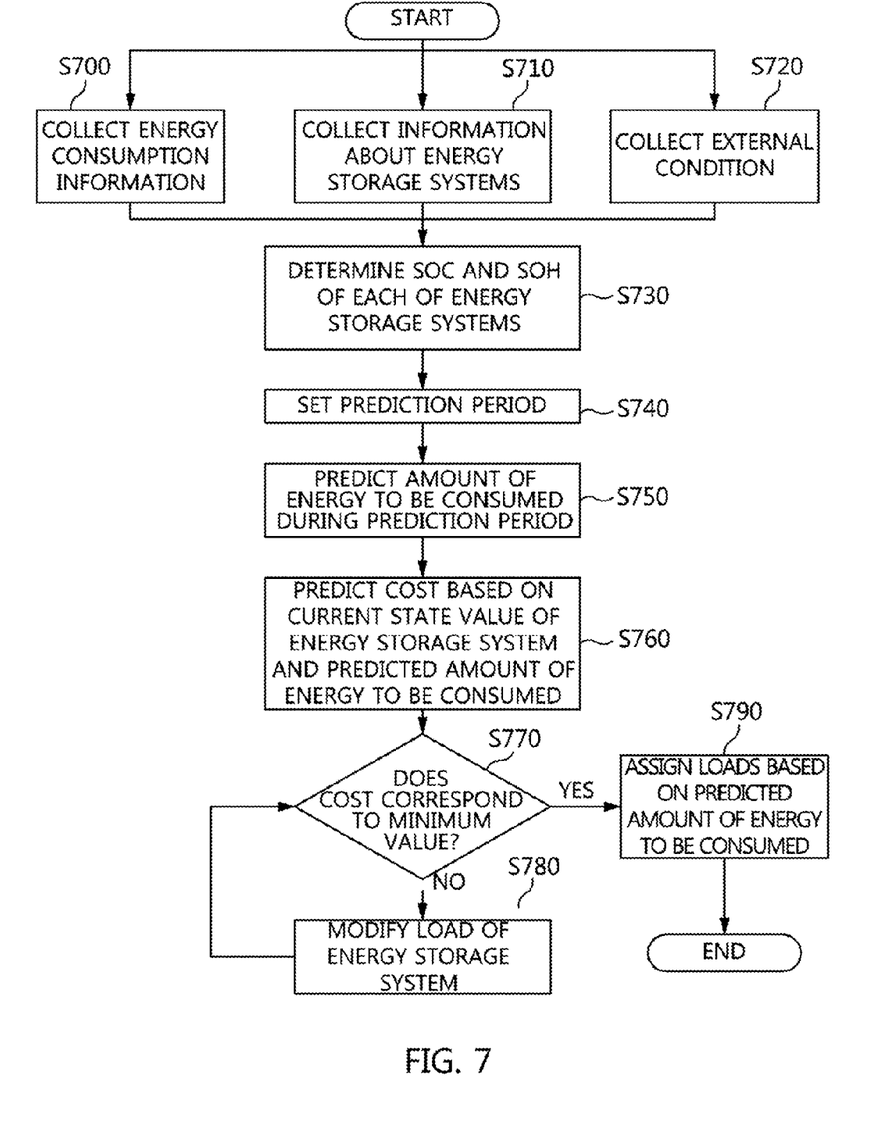
FIG. 7 is an operation flowchart showing a method of managing energy based on the SOH of an energy storage system according to an embodiment of the present invention in greater detail.

FIG. 7 is an operation flowchart showing a method of managing energy based on the SOH of an energy storage system according to an embodiment of the present invention in greater detail.

First, information about energy consumption is collected at step S700.

Furthermore, information about energy storage systems is collected at step S710.

Furthermore, an external condition is collected at step S720.

In this case, the external condition may include the external information of a building or information about the real time electricity price.

In this case, the external information of the building may be collected, and then energy may be distributed to the loads based on the SOH of each of the energy storage systems and the external information of the building.

In this case, the external information of the building may include the electricity price corresponding to power used inside the building, and the external temperature of the building.

Furthermore, the SOC and SOH of the energy storage system are determined at step S730.

In this case, the SOH of each of the energy storage systems is represented by a performance index indicative of the comparison between the ideal and current states of the energy storage system.

In this case, the SOH of the energy storage system is determined based on the SOC of the energy storage system based on the input load, output load and voltage of cells that constitute the energy storage system. This will be described with reference to FIG. 2 later.

In this case, the SOC of the energy storage system may refer to the basic operating state of the energy storage system.

In this case, the SOC and SOH of each energy storage system may be calculated using Equations 2 and 3, respectively:

$$SOC = SOC_{init} + (I^*dt)/Q_{max} \quad (2)$$

where $SOC_{init}$ is the SOC in an existing state, dt is the time that has elapsed after the SOC in an existing state was calculated, I is the current flowing through the cell, and $Q_{max}$ is the maximum energy storage capacity of the cell.

$$SOH = -a1^*R + a2^*\ln((SOC-SOC_{min})/(SOC_{max}-SOC_{min})) + a3^*\ln((V-V_{min})/(V_{max}-V_{min})) + a4^*\ln((T-T_{min})/(T_{max}-T_{min})) \quad (3)$$

where R is the internal resistance, SOC is the state of charge, V is the voltage of the cell, T is the temperature, $V_{max}$ is the maximum value of the voltage, $V_{min}$ is the minimum value of the voltage, $SOC_{max}$ is the maximum value of the SOC, $SOC_{min}$ is the minimum value of the SOC, $T_{max}$ is the maximum temperature of the cell, $T_{min}$ is the minimum temperature of the cell, and a1, a2, a3 and a4 are constants.

Furthermore, a prediction period for load prediction is set at step S740, and the amount of energy consumption is predicted for the prediction period at step S750.

In this case, the amount of energy consumption may be predicted using the external temperature of the building. The reason for this is that the loads of energy facilities inside a building are most greatly influenced by a weather environment. The amount of energy consumption may be predicted using Equation 6:

$$P_{predict} = P_{old} \times T_{amb,new}/T_{amb,old} \quad (6)$$

where $P_{predict}$ is the predicted load value, $P_{old}$ is a real load value of a similar past period, $T_{amb,new}$ is current external temperature, and $T_{amb,old}$ is past external temperature.

Furthermore, a cost is predicted based on the current state value of the energy storage system and the predicted amount of energy to be consumed at step S760.

In this case, the current state value of the energy storage system may include the SOC and SOH of the energy storage system determined at step S730.

In this case, the cost may be calculated using Equation 5:

$$COST = I^*V^*PR - a5^*SOH \quad (5)$$

where PR is the real time electricity price, V is the voltage of the energy storage system, I is current flowing through the energy storage system, SOH is the SOH of the energy storage system, and a5 is a constant corresponding to the SOH and the cost.

Furthermore, whether the predicted cost is a minimum value is determined at step S770. If the predicted cost is not a minimum value, the load of the energy storage system is modified at step S780.

In this case, modifying the load of the energy storage system may mean modifying the value of voltage V of the energy storage system and the value of current I flowing through the energy storage system descried in Equation 5.

Furthermore, if the predicted cost is a minimum value, energy is distributed to the loads based on the predicted amount of energy to be consumed at step S790.

In this case, the energy stored in the energy storage system is distributed to the loads inside the building in such a way as to calculate a cost based on the real time electricity price, the SOH of the energy storage system and the current and voltage of the energy storage system, calculate costs while varying the current and the voltage, and then distribute the energy stored in the energy storage system to the loads inside the building based on current and voltage corresponding to the minimum cost of the calculated costs.

An apparatus and method for managing energy in a building based on the SOH of an energy storage system according to the present invention are not limited to the above-described embodiments, all or parts of the embodiments may be selectively combined together such that various modifications and alterations can be achieved.

At least one embodiment of the present invention can assign loads by taking into account the SOH of an energy storage system, thereby effectively assigning loads while minimizing the maintenance cost of the energy storage system inside a building.

At least one embodiment of the present invention can predict costs by taking into account the maintenance cost of an energy storage system and the cost of power consumption and also can use a load assignment method corresponding to a minimum cost, thereby minimizing the maintenance cost of a building.

At least one embodiment of the present invention can predict power consumption using the external temperature of a building and also can assign loads using the predicted power consumption, thereby effectively assigning loads.

Figure 8:
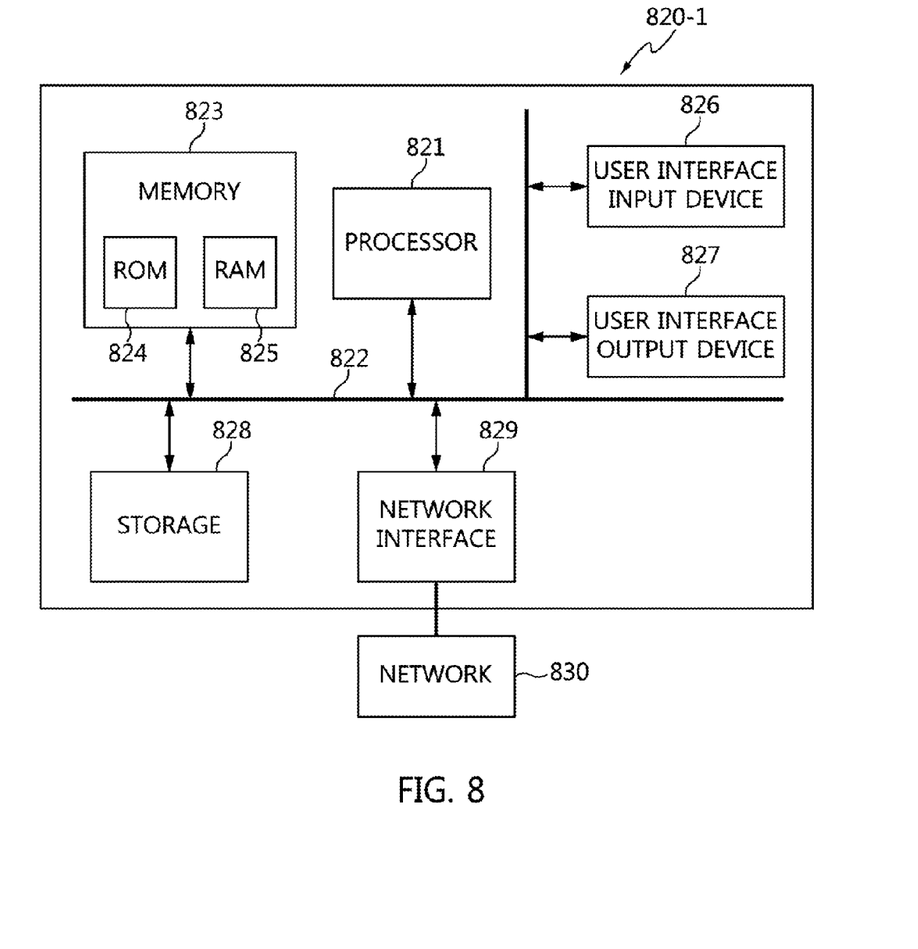
FIG. 8 is an embodiment of the present invention implemented in a computer system.

FIG. 8 is an embodiment of the present invention implemented in a computer system.

Referring to FIG. 8, an embodiment of the present invention may be implemented in a computer system, e.g., as a computer readable medium. As shown in in FIG. 8, a computer system 820-1 may include one or more of a processor 821, a memory 823, a user input device 826, a user output device 827, and a storage 828, each of which communicates through a bus 822. The computer system 820-1 may also include a network interface 829 that is coupled to a network 830. The processor 821 may be a central processing unit (CPU) or a semiconductor device that executes processing instructions stored in the memory 823 and/or the storage 828. The memory 823 and the storage 828 may include various forms of volatile or non-volatile storage media. For example, the memory may include a read-only memory (ROM) 824 and a random access memory (RAM) 825.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for managing energy, comprising:
   a State-of-Health (SOH) determination unit configured to collect information about energy storage systems and energy facilities that consume or generate energy, and to determine a State of Health (SOH) of each of the energy storage systems based on the information; and
   an energy distribution unit configured to distribute energy stored in the energy storage system to loads inside a building based on the information and the SOH,
   wherein the SOH determination unit comprises:
   a State-of-Charge (SOC) determination unit configured to determine a State of Charge (SOC) based on an input load, output load and voltage of each cell of the energy storage system; and
   a determination unit configured to determine the SOH based on the SOC, the voltage of the cell, and the temperature of the cell, and
   wherein the SOC determination unit determines the SOC using the following equation:

$$SOC = SOC_{init} + (I*dt)/Q_{max}$$

where $SOC_{init}$ is the SOC in an existing state, dt is the time that has elapsed after the SOC in an existing state was calculated, I is the current flowing through the cell, and $Q_{max}$ is the maximum energy storage capacity of the cell.

2. The apparatus of claim 1, wherein the determination unit determines the SOH of the energy storage system using the following equation:

$$SOH = -a1*R + a2*\ln((SOC-SOC_{min})/(SOC_{max}-SOC_{min})) + a3*\ln((V-V_{min})/(V_{max}-V_{min})) + a4*\ln((T-T_{min})/(T_{max}-T_{min}))$$

where R is the internal resistance, SOC is the state of charge, V is the voltage of the cell, T is the temperature, $V_{max}$ is a maximum value of the voltage, $V_{min}$ is a minimum value of the voltage, $SOC_{max}$ is a maximum value of the SOC, $SOC_{min}$ is a minimum value of the SOC, $T_{max}$ is a maximum temperature of the cell, $T_{min}$ is a minimum temperature of the cell, and a1, a2, a3 and a4 are constants.

3. The apparatus of claim 1, wherein the energy distribution unit comprises:
   a collection unit configured to collects external information of the building; and
   a prediction unit configured to predict a method of distributing energy to the loads based on the external information of the building and the SOH of the energy storage system.

4. The apparatus of claim 3, wherein the collection unit collects information of a real time electricity price.

5. The apparatus of claim 4, wherein the prediction unit comprises:
   a cost calculation unit configured to calculate a cost based on the real time electricity price, the SOC of the energy storage system, the SOH of the energy storage system, and a predicted load value; and
   a determination unit configured to determine a load assignment method, corresponding to the predicted load value, based on the cost.

6. The apparatus of claim 5, wherein the determination unit determines the load assignment method so that the load assignment method corresponds to the cost having a minimum value.

7. The apparatus of claim 6, wherein the cost calculation unit calculates the cost using the following equation:

$$COST = I*V*PR - a5*SOH$$

where PR is the real time electricity price, V is the voltage of the energy storage system, I is current flowing through the energy storage system, SOH is the SOH of the energy storage system, and a5 is a constant corresponding to the SOH and the cost.

8. The apparatus of claim 6, wherein the cost calculation unit predicts the load value using the following equation:

$$P_{predict} = P_{old} \times T_{amb,new}/T_{amb,old}$$

where $P_{predict}$ is the predicted load value, $P_{old}$ is a real load value of a similar past period, $T_{amb,new}$ is current external temperature, and $T_{amb,old}$ is past external temperature.

9. A method of managing energy, comprising:
   collecting information about one or more energy storage systems and energy facilities that consume or generate energy, and determining a State of Health (SOH) of each of the energy storage systems based on the information; and
   distributing energy stored in the energy storage system to loads inside a building based on the information and the SOH,
   wherein determining the SOH comprises:
   determining a State of Charge (SOC) based on an input load, output load and voltage of each cell of the energy storage system; and
   determining the SOH based on the SOC, the voltage of the cell, and temperature of the cell, and
   wherein determining the SOC comprises determining the SOC using the following equation:

$$SOC = SOC_{init} + (I*dt)/Q_{max}$$

where $SOC_{init}$ is the SOC in an existing state, dt is the time that has elapsed after the SOC in an existing state was calculated, I is the current flowing through the cell, and $Q_{max}$ is the maximum energy storage capacity of the cell.

10. The method of claim 9, wherein determining the SOH comprises determining the SOH using the following equation:

$$SOH=-a1*R+a2*\ln((SOC-SOC_{min})/(SOC_{max}-SOC_{min}))+a3*\ln((V-V_{min})/(V_{max}-V_{min}))+a4*\ln((T-T_{min})/(T_{max}-T_{min}))$$

where R is the internal resistance, SOC is the state of charge, V is the voltage of the cell, T is the temperature, $V_{max}$ is a maximum value of the voltage, $V_{min}$ is a minimum value of the voltage, $SOC_{max}$ is a maximum value of the SOC, $SOC_{min}$ is a minimum value of the SOC, $T_{max}$ is a maximum temperature of the cell, $T_{min}$ is a minimum temperature of the cell, and a1, a2, a3 and a4 are constants.

11. The method of claim 9, wherein distributing the energy comprises:
collecting external information of the building; and
predicting a method of distributing energy to the loads based on the external information of the building and the SOH of the energy storage system.

12. The method of claim 11, wherein collecting the external information comprises collecting information of a real time electricity price.

13. The method of claim 12, wherein predicting the method of distributing energy comprises:
calculating a cost based on the real time electricity price, the SOC of the energy storage system, the SOH of the energy storage system, and a predicted load value; and
determining a load assignment method, corresponding to the predicted load value, based on the cost.

14. The method of claim 13, wherein determining the load assignment method comprises determining the load assignment method so that the load assignment method corresponds to the cost having a minimum value.

15. The method of claim 14, wherein calculating the cost comprises calculating the cost using the following equation:

$$COST=I*V*PR-a5*SOH$$

where PR is the real time electricity price, V is the voltage of the energy storage system, I is the current flowing through the energy storage system, SOH is the SOH of the energy storage system, and a5 is a constant corresponding to the SOH and the cost.

16. The method of claim 14, wherein calculating the cost comprises predicting the load value using the following equation:

$$P_{predict}=P_{old} \times T_{amb,new}/T_{amb,old}$$

where $P_{predict}$ is the predicted load value, $P_{old}$ is a real load value of a similar past period, $T_{amb,new}$ is current external temperature, and $T_{amb,old}$ is past external temperature.

* * * * *